Dec. 6, 1927.  1,652,009

H. W. HOFFMASTER

TROLLEY

Filed June 14, 1927

Inventor
Harry W. Hoffmaster,
By
Attorney

Patented Dec. 6, 1927.

1,652,009

UNITED STATES PATENT OFFICE.

HARRY W. HOFFMASTER, OF READING, PENNSYLVANIA, ASSIGNOR TO READING CHAIN & BLOCK CORPORATION, OF READING, PENNSYLVANIA, A CORPORATION OF PENNSYLVANIA.

TROLLEY.

Application filed June 14, 1927. Serial No. 198,710.

This invention relates to improvements in trolleys and it pertains more particularly to trolleys for use in connection with overhead tracks for hoists, cranes and other traveling devices.

The invention consists of a trolley in which one wheel or both wheel members may be easily and quickly removed from the yoke, to the end that the trolley may be easily and quickly removed or replaced from or to the track.

This overhead track is usually in the form of an I-beam, and unless there is an open end to the track, it is very seldom possible to remove the trolley without destroying one or more parts thereof. Even when there is an open end track, the annoyance and inconvenience is very great.

In my present invention, I have devised a trolley in which each trolley wheel spindle or axle is formed with an annular groove near its inner end, and a specially formed washer to engage said groove, to the end that either of the wheels may be removed by the withdrawal of its axle and the whole device easily lifted from the I-beam.

The invention is more fully described in the following specification and clearly illustrated in the accompanying drawing, in which:—

The numeral 1 designates the yoke and 2 the hubs thereof. 3 designates the trolley wheels, mounted rotatably on spindles or axles 4 which are slidably removable from the hubs and 5 designates the set screws for securing the axles in the hubs.

The axles are each formed with an annular groove 7 near the inner end, and 8 designates an open washer adapted to slide over the axle and engage the annular groove therein, and this washer serves as a retainer to hold the wheel on its axle.

Figure 1:
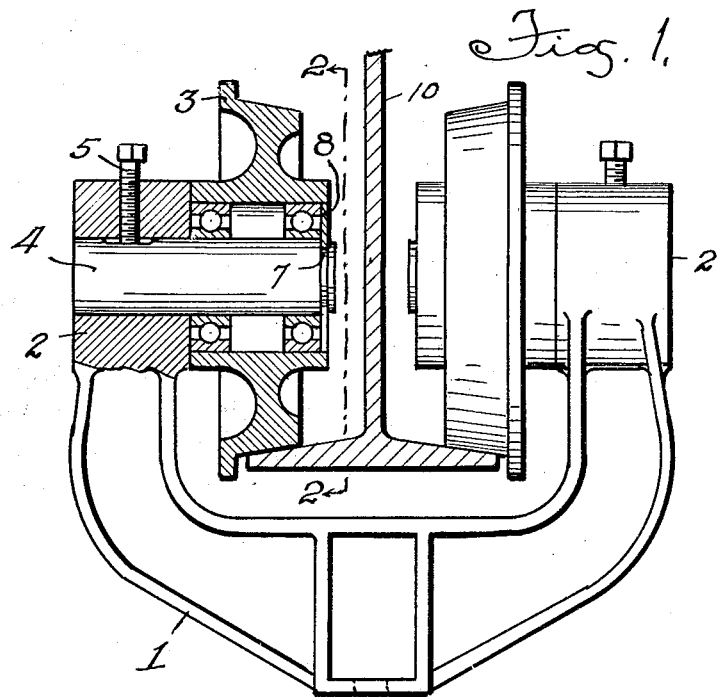
Figure 1 is an elevational view, partly in section, of my improved trolley.
Figure 2:
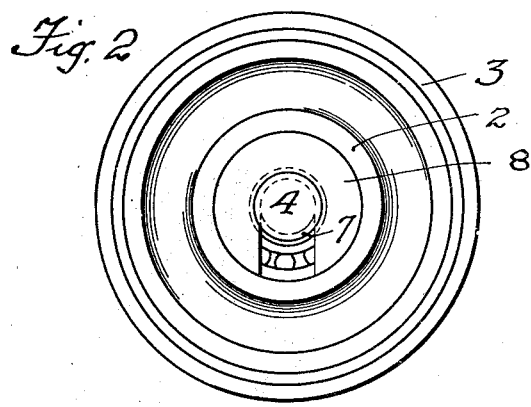
Figure 2 is a sectional view on line 2—2 of Fig. 1.

In normal position, as shown in Figure 1, this washer is countersunk in the hub, so that the inner surface of the washer is flush with the face of the hub.

When it is desired to remove the trolley from the I-beam, indicated by numeral 10, the set screw is turned to release its hold on the axle, and the axle is forced inwardly, that is, towards the centre of the trolley device. This movement carries the washer with it, and, when free from the hub, the washer may be slid from its engagement with the annular groove in the axle, the axle withdrawn, and the wheel removed, thus permitting the device to be removed from the I-beam or track.

It is evident that either of the wheels may be removed, depending on the access to be had more easily thereto.

What I claim is:—

In a trolley, a yoke having hubs, axles removably secured in each hub, a wheel rotatably mounted on each axle, said axles having each an annular groove near its inner end, and an open washer adapted to engage the annular groove and to lie normally within the wheel hub.

In testimony whereof I affix my signature.

HARRY W. HOFFMASTER.